United States Patent [19]
Alexander

[11] 4,145,098
[45] Mar. 20, 1979

[54] ARTICLE OF FURNISHING

[75] Inventor: Robert L. Alexander, Erlanger, Ky.

[73] Assignee: Hunt Manufacturing Co., Philadelphia, Pa.

[21] Appl. No.: 923,218

[22] Filed: Jul. 10, 1978

[51] Int. Cl.² .................... A47B 47/03; A47B 17/00
[52] U.S. Cl. .................... 312/257 SM; 108/111; 312/195; 312/263
[58] Field of Search .................... 312/195, 194, 257 R, 312/257 SK, 257 SM, 257 A, 263; 108/109, 111

[56] References Cited
U.S. PATENT DOCUMENTS

| | | | |
|---|---|---|---|
| 2,658,101 | 11/1953 | Coxe, Jr. | 312/257 R |
| 3,181,923 | 5/1965 | Guillon et al. | 312/195 |
| 3,786,765 | 1/1974 | Burr | 312/257 |
| 3,896,743 | 7/1975 | Pariente | 108/111 |

*Primary Examiner*—Mervin Stein
*Assistant Examiner*—Alex Grosz
*Attorney, Agent, or Firm*—Harding, Earley & Follmer

[57] ABSTRACT

An article of furnishing has a plurality of upstanding sheet panels and a substantially horizontal connecting panel removably connected to the upstanding panels. An upright adjacent each end of each upstanding panel is connected thereto by a sliding joint including at least one headed member on each upstanding panel for cooperation with a T-shaped opening in the upright. Advantageously, a substantially horizontal bottom panel is removably secured to bottom flanges on the upstanding panels by sliding fittings. A shelf having a pair of legs pivoted thereto for folding may be mounted on the bottom panel.

10 Claims, 9 Drawing Figures

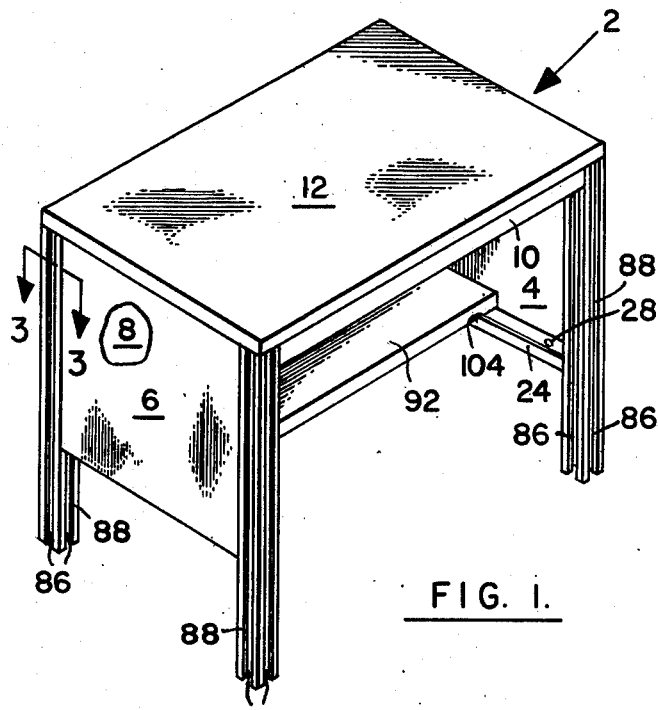
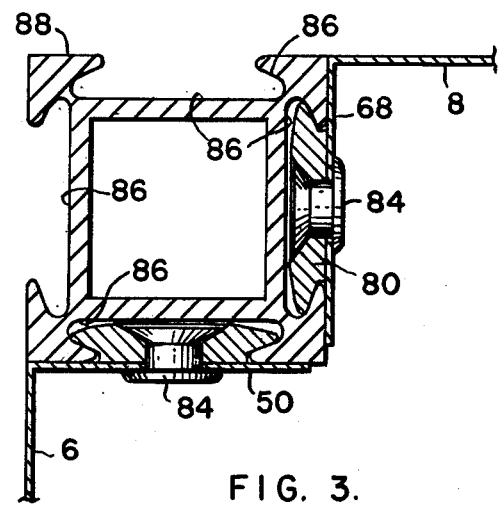
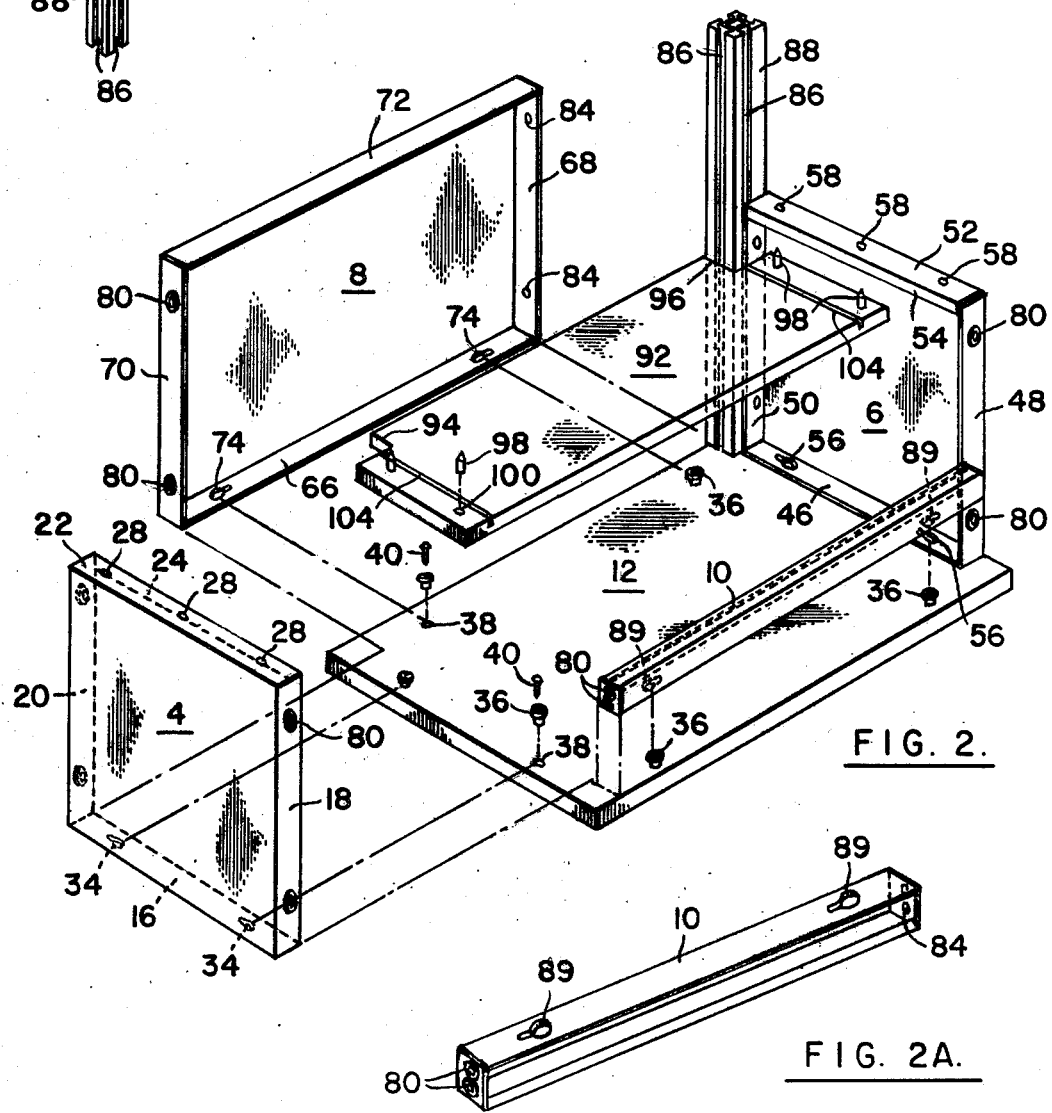

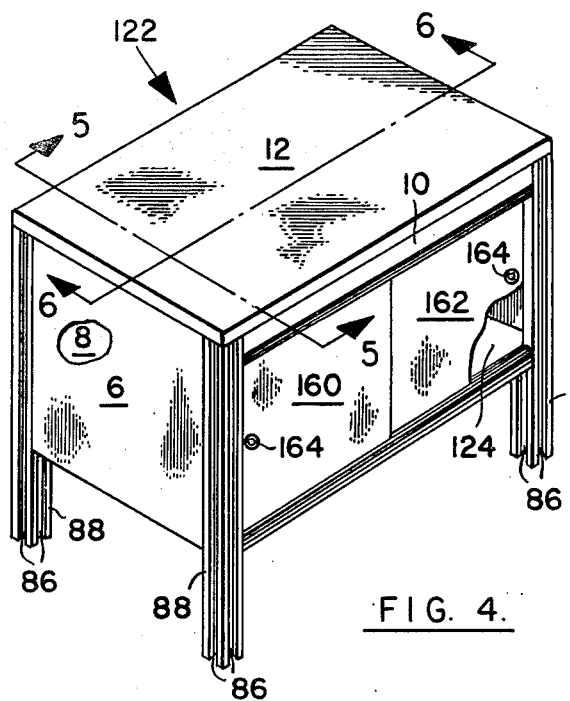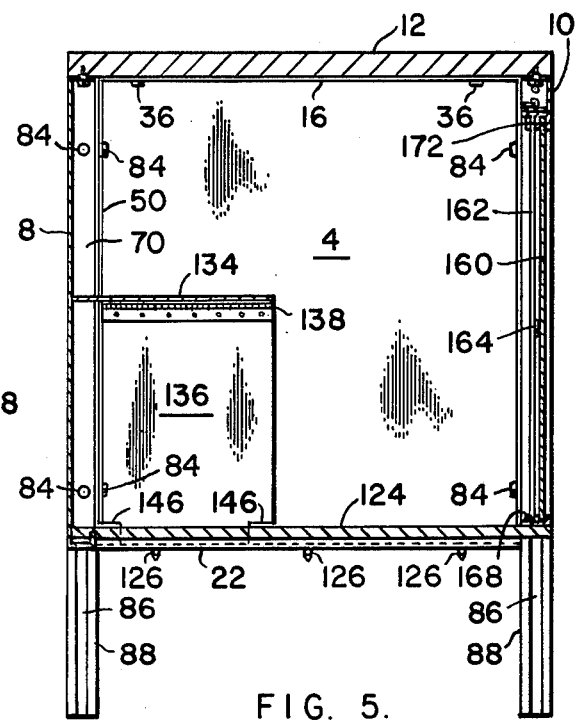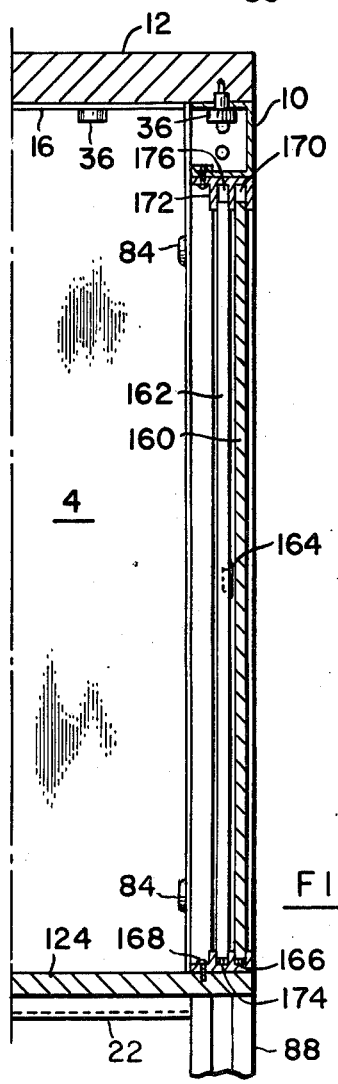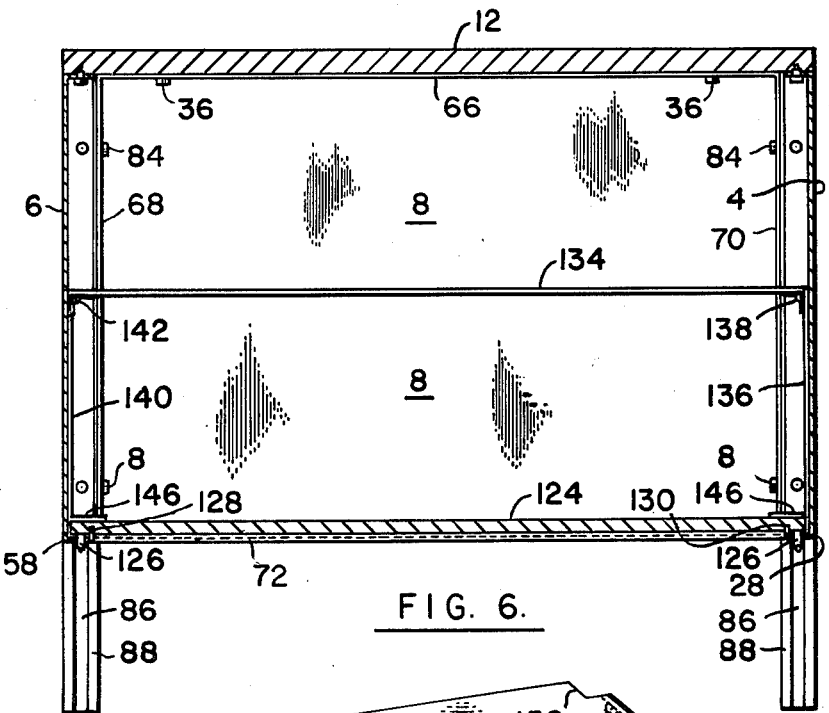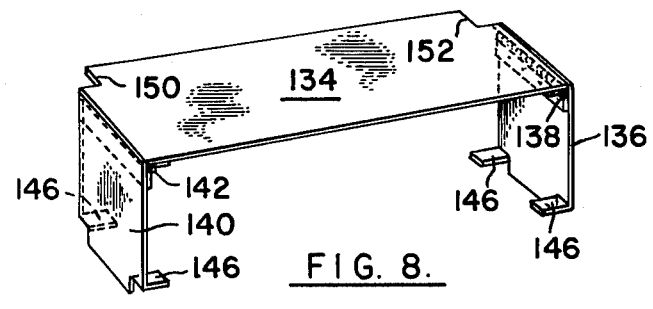

ARTICLE OF FURNISHING

BACKGROUND OF THE INVENTION

The use of sliding joints to secure together the parts of articles of furnishing is seen in prior art U.S. Pat. Nos. 361,111, 1,608,592, 2,940,718, 3,462,110 and British Patent No. 1,003,207. This invention is distinguished from the prior art in that it permits the formation of a wide variety of articles of furnishing such as, for example, typewriter stands, bookcases, cabinets, files, scrap baskets and the like by the assembly of parts including sheet metal panels without the necessity for employing any fastenings or tools.

BRIEF SUMMARY OF THE INVENTION

An article of furnishing has a plurality of upstanding sheet panels and a substantially horizontal connecting panel removably connected to the upstanding panels. An upright adjacent each end of each upstanding panel is connected thereto by a sliding joint including at least one headed member on each upstanding panel for cooperation with a T-shaped opening in the upright. Advantageously, a substantially horizontal bottom panel is removably secured to bottom flanges on the upstanding panels by sliding fittings. A shelf having a pair of legs pivoted thereto for folding may be mounted on the bottom panel.

BRIEF DESCRIPTION OF THE DRAWINGS

FIG. 1 is a front perspective view of a table in accordance with the invention;

FIG. 2 is a perspective view, partially exploded, of parts of the table of FIG. 1 inverted;

FIG. 2A is a perspective view of the front panel of the table of FIG. 1 inverted;

FIG. 3 is a horizontal section, partially broken away, taken on the plane indicated by the line 3—3 in FIG. 1;

FIG. 4 is a front perspective view of a modification of the table of FIG. 1 to include an enclosed storage area;

FIG. 5 is a vertical section taken on the plane indicated by the line 5—5 in FIG. 4;

FIG. 6 is a vertical section taken on the plane indicated by the line 6—6 in FIG. 4;

FIG. 7 is an enlarged view of a portion of the parts shown in FIG. 5; and

FIG. 8 is a front perspective view of the shelf incorporated in the article of FIG. 4.

DETAILED DESCRIPTION

A table 2 (FIG. 1) in accordance with the invention useful, for example, for supporting a typewriter, has sheet side panels 4 and 6, a sheet rear panel 8 and a box-like front panel 10, each of the panels being made for example from a single sheet of sheet metal. Table 2 has a solid top 12 acting as a connecting panel. Side panel 4 has an inwardly directed top flange 16, side flanges 18 and 20 and bottom flange 22. Bottom flange 22 has an upwardly directed portion 24 at the inner edge thereof. Bottom flange 22 has spaced round openings 28. Upper flange 16 has a pair of keyhole slots 34 adapted to slidingly engage a pair of headed members 36 each secured in an opening 38 in the bottom of top 12 by a screw 40. Similarly, side panel 6 has an upper flange 46, side flanges 48 and 50 and a lower flange 52 with an upwardly extending portion 54 similar to flange portion 24. Flange 52 has spaced round openings 58. Upper flange 46 has a pair of keyhole slots 56 adapted to slidably engage a pair of headed members 36 in top 12. Similarly, rear panel 8 has an upper flange 66, side flanges 68 and 70 and a bottom flange 72. Upper flange 66 has keyhole slots 74 adapted to engage headed members 36 secured to top 12.

Each of side flanges 18, 20, 48, 50, 68 and 70 has a pair of spaced buttons 80 each secured thereto by a rivet 84. Similarly, each end of panel 10 has secured thereto a pair of buttons 80 by rivets 84. Each button 80 is slidably engaged in one of four vertical T-slots 86 in an adjacent upright 88, there being an upright 88 at each corner. Panel 10 has keyhole slots 89 for engaging headed members 36 on the bottom of top 12.

A solid shelf (bottom panel) 92 is supported on lower flanges 22, 52 and 72 and has rear cutout corner portions 94 and 96 to accommodate the adjacent uprights 88 and adjacent portions of panels 4, 6 and 8. Pins 98 secured in openings 100 in the bottom of shelf 92 engage the rear pair of openings 28 and 58 with a tight fit to hold shelf 92 down against flanges 22, 52 and 72. Each of flange portions 24 and 54 are received in a groove 104 in the bottom of shelf 92 to increase the rigidity of the structure.

Assembly of the table 2 is readily accomplished by first placing the top 12 upside down and assembling panels 4, 6, 8 and 10 sequentially to the top by placing headed members 36 in the large portions of key slots 34, 54, 74 and 89, respectively, and sliding the panels to place the headed members in the narrow portions of the key slots to lock the panels to the top. An upright 88 at each corner is moved downwardly to engage the buttons 80 on the adjacent panels in a pair of T-slots 86, the upright 88 being moved downwardly until it rests against top 12. The table 2 is then turned right-side up and shelf 92 is installed by placing it above flanges 22, 52 and 72 and then moving the shelf 92 downwardly to cause pins 98 to enter adjacent openings 28 and 58 and grooves 104 to engage portions 24 and 54 of flanges 22 and 52, respectively. It will be understood that once the uprights 88 have been placed in position, they act to prevent the sliding of panels 4, 6, 8 and 10 so as to release heads 36 from their respective key slots and hence insure that the panels remain locked to the top 12. Shelf 92 is advantageous for purposes of storage and also to provide substantially increased rigidity for the table.

Referring now to FIG. 4, a cabinet 122 in accordance with the invention employs all the elements of table 2 with the exception of shelf 92, the corresponding parts being given the same numbers. In order to complete the cabinet 122, the parts described below are added thereto.

In lieu of shelf 92, a solid bottom panel 124 rests on flanges 22, 52 and 72 and is coextensive with the top 12 with the exception of being cut out at the corners (not shown) to accommodate uprights 88 and the adjacent panels. Bottom panel 124 has a pin 126 tightly engaged in each of the openings 28 and 58 in bottom flanges 22 and 52, respectively. Bottom panel 124 has grooves 128 and 130 which respectively are engaged by portions 54 and 24 of flanges 52 and 22, respectively. Thus, the structure of bottom panel 124 is essentially the same as that of bottom panel 92 of table 2 but bottom panel 124 extends from the front to the rear of cabinet 122.

Cabinet 122 is provided with a removable shelf 134 (FIG. 8) which has a leg 136 connected to the shelf by a piano hinge 138 and a leg 140 connected by a piano hinge 142. Legs 136 and 140 fit between the inside of panels 4 and 6, respectively, and bottom panel 124 as best seen in FIG. 6. Legs 136 and 140 each have a pair of inwardly extending fingers 146 which rest on the top of bottom panel 124. When shelf 134 is removed, legs 136 and 140 can be folded inwardly to conserve packing space for shipment or storage. Shelf 134 is cut out at its rear corners as indicated at 150 and 152 (FIG. 8) to accommodate the rear uprights 88 and adjacent panel structure.

Cabinet 122 has a pair of sliding doors 160 and 162 each having a knob 164. Door 162 is mounted in a track 166 of a fitting 168 secured to the front of bottom panel 124 (FIG. 7) and in a track 170 of a fitting 172 secured to the bottom of front panel 10. Similarly, door 160 is mounted in a track 174 of fitting 168 and a track 176 of fitting 172. Fittings 168 and 172 are secured respectively to the bottom panel 124 and front panel 10 prior to assembly and doors 160 and 162 are mounted by first inserting them into their respective tracks 170 and 176 and then permitting them to be lowered into their respective tracks 166 and 174. Shelf 134 is inserted prior to the mounting of doors 160 and 162, the insertion involving simply folding legs 136 and 140 to extend directly downwardly, placing the shelf 134 inside cabinet 122 against rear panel 8 and inside of flanges 68 and 70 and then moving it downwardly to position legs 136 and 140 on either side of bottom panel 124 and adjacent side panels 4 and 6, respectively, until fingers 146 rest upon the top of bottom panel 124.

It will be understood that the above-described embodiments are illustrative and are not intended to be limiting.

I claim:

1. An article of furnishing comprising:
a plurality of upstanding sheet panels,
a substantially horizontal connecting panel,
sliding joint means for removably connecting the upstanding panels to the connecting panel, said sliding joint means comprising headed members secured to the connecting panel and keyhole slots in the upstanding panels for receiving each headed member,
an upright adjacent each end of each upstanding panel, and
sliding joint means for securing the upstanding panels to the uprights including a flange having at least one headed member at each end of each upstanding panel and "T" shaped openings extending the length of the uprights for the reception of the headed members in the uprights.

2. An article in accordance with claim 1 having three upstanding panels and four uprights.

3. An article in accordance with claim 1 having four upstanding panels and four uprights.

4. An article in accordance with claim 1 in which the connecting panel forms the top of the article.

5. An article in accordance with claim 1 in which each of a pair of opposed upstanding panels has a bottom inwardly directed flange having openings for the reception of a pin and a horizontal bottom panel is supported by said bottom flanges, said horizontal panel having pins fitting tightly in said openings.

6. An article in accordance with claim 5 in which each bottom flange has an upturned portion engaged in a groove in the bottom panel.

7. An article in accordance with claim 1 in which each of a pair of opposed upstanding panels has a bottom inwardly directed flange, a horizontal bottom panel is supported by said bottom flanges spaced away from said pair of panels, a shelf spaced above the bottom panel has a pair of pivoted legs mounted respectively between the pair of opposed panels and the bottom panel with at least one inwardly projecting portion of each leg resting on the bottom panel.

8. An article of furnishing comprising:
an upstanding sheet rear panel,
a pair of upstanding sheet side panels,
a top connecting panel having depending locking members,
each of said rear and side panels having inwardly extending means including a flange for slidably engaging locking members on the connecting panel,
an upright adjacent each end of each of the rear and side panels, each upright having a vertical "T" slot facing each adjacent rear and side panel and extending the length of the upright,
each rear and side panel having an inwardly directed side flange with at least two spaced headed members for sliding engagement in a slot of an upright and each side panel having an inwardly directed bottom flange with at least two spaced openings, and
a bottom panel supported by said bottom flanges and having pins removably engaged in openings in the bottom flanges.

9. An article in accordance with claim 8 in which the bottom flange of the side panels each having an upturned portion engaging a groove in the bottom panel.

10. An article in accordance with claim 8 in which a shelf spaced above the bottom panel has a pair of pivoted legs mounted respectively between the side panels and the bottom panel with at least one inwardly projecting portion of each leg resting on the bottom panel.

* * * * *